US012643670B2

(12) United States Patent
Berjot et al.

(10) Patent No.: US 12,643,670 B2
(45) Date of Patent: Jun. 2, 2026

(54) PROPULSION UNIT COMPRISING A SUSPENSION SYSTEM OF THE REAR PART OF THE ENGINE, AIRCRAFT COMPRISING AT LEAST ONE SUCH PROPULSION UNIT

(71) Applicant: Airbus Operations SAS, Toulouse (FR)

(72) Inventors: Michael Berjot, Toulouse (FR); Rémi Lansiaux, Toulouse (FR); Jean-Baptiste Vignes, Toulouse (FR); Veronica Paraschiv, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 0 days.

(21) Appl. No.: 18/761,946

(22) Filed: Jul. 2, 2024

(65) Prior Publication Data

US 2025/0010999 A1 Jan. 9, 2025

(30) Foreign Application Priority Data

Jul. 4, 2023 (FR) ...................................... 2307123

(51) Int. Cl.
*B64D 27/40* (2024.01)
*F02C 7/20* (2006.01)

(52) U.S. Cl.
CPC ......... *B64D 27/404* (2024.01); *B64D 27/406* (2024.01); *F02C 7/20* (2013.01); *B64D 27/402* (2024.01)

(58) Field of Classification Search
CPC .. B64D 27/404; B64D 27/402; B64D 27/406; B64D 27/40; F02C 7/20
USPC ....................................................... 248/554
See application file for complete search history.

(56) References Cited

U.S. PATENT DOCUMENTS

| | | | | |
|---|---|---|---|---|
| 4,022,018 A | * | 5/1977 | Tuten .................... | B64D 27/402 60/797 |
| 4,458,863 A | * | 7/1984 | Smith .................... | B64D 27/18 239/265.29 |
| 4,471,609 A | * | 9/1984 | Porter .................... | F01D 25/14 244/129.4 |
| 4,603,821 A | * | 8/1986 | White .................... | B64D 27/18 60/797 |
| 5,320,307 A | * | 6/1994 | Spofford .............. | B64D 27/406 60/797 |
| 5,443,229 A | * | 8/1995 | O'Brien ................. | B64D 27/20 60/797 |

(Continued)

FOREIGN PATENT DOCUMENTS

| | | | |
|---|---|---|---|
| CN | 116280221 A | 6/2023 | |
| EP | 4194340 A1 * | 6/2023 | ................ F02C 7/20 |

(Continued)

OTHER PUBLICATIONS

French Search Report for corresponding French Patent Application No. 2307123 dated Dec. 14, 2023.

*Primary Examiner* — Taylor Morris
(74) *Attorney, Agent, or Firm* — Greer, Burns & Crain, Ltd.

(57) ABSTRACT

A propulsion unit comprising an engine, a pylon, an engine mount system which connects a front part of the engine and the pylon, in addition to a suspension system which connects the pylon and a rear part of the engine which is offset toward the rear end of the engine relative to the engine mount system.

13 Claims, 2 Drawing Sheets

(56)                References Cited

U.S. PATENT DOCUMENTS

| | | | | |
|---|---|---|---|---|
| 5,620,154 | A * | 4/1997 | Hey | F02C 7/20 60/797 |
| 6,347,765 | B1 * | 2/2002 | Jule | B64D 27/40 60/797 |
| 6,474,597 | B1 * | 11/2002 | Cazenave | B64D 27/406 244/54 |
| 8,827,203 | B2 | 9/2014 | Balk | |
| 10,094,393 | B2 * | 10/2018 | Hill | F04D 29/522 |
| 10,246,196 | B2 * | 4/2019 | Pautis | B64D 27/18 |
| 10,808,622 | B2 | 10/2020 | Suciu et al. | |
| 11,407,518 | B2 | 8/2022 | Schelfaut et al. | |
| 2008/0169377 | A1 * | 7/2008 | Levert | B64D 27/404 244/54 |
| 2009/0077978 | A1 * | 3/2009 | Figueroa | F02C 7/20 60/766 |
| 2010/0101205 | A1 | 4/2010 | Weyland et al. | |
| 2013/0227952 | A1 * | 9/2013 | Grip | F01D 25/30 60/770 |
| 2013/0319007 | A1 * | 12/2013 | Peters | F02K 1/822 415/196 |
| 2014/0064950 | A1 * | 3/2014 | Brochard | B64D 27/20 415/213.1 |
| 2014/0084129 | A1 * | 3/2014 | Sandy | B64D 27/406 248/554 |
| 2017/0152052 | A1 * | 6/2017 | Ewens | B64D 27/402 |
| 2019/0185170 | A1 * | 6/2019 | Schelfaut | B64D 27/406 |
| 2020/0189759 | A1 * | 6/2020 | Auge | B64D 27/404 |
| 2021/0253260 | A1 * | 8/2021 | Schelfaut | B64D 27/406 |
| 2021/0261263 | A1 | 8/2021 | Schelfaut et al. | |
| 2021/0269167 | A1 * | 9/2021 | Colmagro | B64D 27/402 |
| 2021/0323690 | A1 | 10/2021 | Garnaud et al. | |
| 2022/0120218 | A1 * | 4/2022 | Schelfaut | F02C 7/20 |
| 2023/0182912 | A1 | 6/2023 | Stretton | |
| 2024/0052781 | A1 * | 2/2024 | Glemarec | F02C 7/20 |

FOREIGN PATENT DOCUMENTS

| | | | | |
|---|---|---|---|---|
| EP | 4438486 | A1 * | 10/2024 | B64D 27/404 |
| FR | 3088902 | A1 * | 5/2020 | B64D 27/404 |
| FR | 3118992 | A1 * | 7/2022 | B64D 27/404 |
| GB | 827027 | A * | 2/1960 | B64D 27/26 |
| GB | 2634911 | A * | 4/2025 | F02C 7/20 |
| WO | WO-9611843 | A1 * | 4/1996 | B64D 27/18 |
| WO | WO-2025146525 | A1 * | 7/2025 | F02C 7/20 |

* cited by examiner

PROPULSION UNIT COMPRISING A SUSPENSION SYSTEM OF THE REAR PART OF THE ENGINE, AIRCRAFT COMPRISING AT LEAST ONE SUCH PROPULSION UNIT

CROSS-REFERENCES TO RELATED APPLICATIONS

This application claims the benefit of French Patent Application Number 2307123 filed on Jul. 4, 2023, the entire disclosure of which is incorporated herein by way of reference.

FIELD OF THE INVENTION

The present application relates to a propulsion unit comprising a suspension system of the rear part of the engine, in addition to an aircraft comprising at least one such propulsion unit.

BACKGROUND OF THE INVENTION

According to a configuration which can be seen in FIGS. 1 and 2, an aircraft 10 comprises a plurality of propulsion units 12 which are positioned below the wing 14 of the aircraft 10.

A propulsion unit 12 comprises an engine 16, a nacelle (not shown in FIG. 2) positioned about the engine 16, in addition to a pylon 18 which connects the engine 16 to the remainder of the aircraft 10, in particular to the wing 14.

For the remainder of the description, a longitudinal direction X is parallel to the axis of rotation of the engine A16. A transverse plane is a plane perpendicular to the axis of rotation of the engine A16. A transverse and horizontal direction Y is a direction perpendicular to the axis of rotation of the engine A16 and horizontal. A transverse and vertical direction Z is a direction perpendicular to the axis of rotation of the engine A16 and vertical. A vertical median plane is a vertical plane containing the axis of rotation of the engine A16. The terms "front" and "rear" refer to the direction of flow of the airflow into the engine 16, said airflow flowing from front to back.

The engine 16 comprises a fan 20, in addition to a jet engine core 22 comprising a front part 22.1 integrating, in particular, the compression stages and combustion chambers, in addition to a rear part 22.2 integrating, in particular, the turbines and a nozzle. The pylon 18 comprises a primary structure 24 in the form of a box, which is connected to the wing 14 by a wing mount 26 and to the engine 16 by a front engine mount 28.1, in addition to a rear engine mount 28.2 and a pair of thrust rods 28.3 which ensure the take-up of thrust forces. More specifically, the front and rear engine mounts 28.1, 28.2 connect the front part 22.1 of the jet engine core 22 and the primary structure 24 of the pylon 18.

In the case of the rupture of a turbine disk, the rear part 22.2 of the jet engine core 22 can become separated from the front part 22.1 in the region of a rupture zone ZR and become detached from the propulsion unit 12.

SUMMARY OF THE INVENTION

The present invention aims to remedy all or some of the drawbacks of the prior art. To this end, the subject of the invention is a propulsion unit comprising an engine which has an engine axis of rotation, a nacelle positioned about the engine, a pylon, in addition to an engine mount system which connects the engine and the pylon, the engine extending between the front and rear ends and comprising a fan, in addition to a jet engine core which comprises front and rear parts, the engine mount system comprising a front engine mount, a rear engine mount, in addition to a pair of thrust rods which ensure the take-up of thrust forces, and the rear part of the jet engine core being offset toward the rear end of the engine relative to the rear engine mount and extending as far as this rear end.

According to the invention, the propulsion unit comprises a suspension system which connects the pylon and the rear part of the jet engine core and which is located between the rear engine mount and the rear end of the engine.

In the case of a malfunction, if the rear part of the jet engine core becomes detached from the front part, this rear part remains connected to the pylon and does not fall off.

According to a further feature, the suspension system comprises a first end which is connected to a first anchoring point fixed to the pylon, in addition to a second end which is connected to a second anchoring point fixed to the second part of the jet engine core, the suspension system having a length, separating the first and second ends, which is greater than a distance separating the first and second anchoring points.

According to a further feature, the rear part of the jet engine core comprises an exhaust casing which has a plurality of structural frames which are offset relative to one another in a direction parallel to the axis of rotation of the engine, the suspension system being connected to one of the structural frames of the exhaust casing.

According to a further feature, the suspension system comprises at least one connecting element which extends between the first and second ends, in addition to at least one joint which connects the first or second end and an element from amongst the pylon and the rear part of the jet engine core, said joint comprising at least one pivot axis parallel to the axis of rotation of the engine.

According to a further feature, the suspension system comprises first and second links in series, each having first and second ends; the first ends of the first and second links being connected to one another by a first joint, the second end of the first link being connected to the pylon by a second joint, the second end of the second link being connected to the rear part of the jet engine core by a third joint and the first, second and third joints each comprising at least one pivot axis parallel to the axis of rotation of the engine.

According to a further feature, the first joint comprises:
a swivel cylinder,
a flat end, having a through-orifice which is configured to house the swivel cylinder, fixed to a first part from amongst the first and second links,
a clevis which is configured to house the flat end, having through-orifices which are configured to house the swivel cylinder, fixed to a second part which is different from the first part from amongst the first and second links.

According to a further feature, the second end comprises:
a swivel cylinder,
a flat end or a bracket, having a through-orifice which is configured to house the swivel cylinder, fixed to a first part from amongst the first link and the pylon,
a clevis which is configured to house the flat end, having through-orifices which are configured to house the swivel cylinder, fixed to a second part which is different from the first part from amongst the first link and the pylon.

According to a further feature, the third end comprises:
a swivel cylinder, a flat end or a bracket, having a through-orifice which is configured to house the swivel cylinder, fixed to a first part from amongst the second link and the rear part of the jet engine core, a clevis which is configured to house the flat end, having through-orifices which are configured to house the swivel cylinder, fixed to a second part which is different from the first part from amongst the second link and the rear part of the jet engine core.

According to a further feature, the suspension system comprises:

a flexible and deformable element which has a length, an elongation of less than 20% of its length and extends between the first and second ends, a first joint which connects the first end and the pylon and which has a pivot axis parallel to the longitudinal direction, a second joint which connects the second end and the rear part of the jet engine core and which has a pivot axis parallel to the longitudinal direction.

According to a further feature, the flexible element is a cable.

A further subject of the invention is an aircraft comprising at least one propulsion unit according to one of the preceding features.

BRIEF DESCRIPTION OF THE DRAWINGS

Further features and advantages will be found in the following description of the invention, the description being provided solely by way of example with reference to the accompanying drawings, in which.

DETAILED DESCRIPTION OF THE PREFERRED EMBODIMENTS

Figures 1, 2, 3:
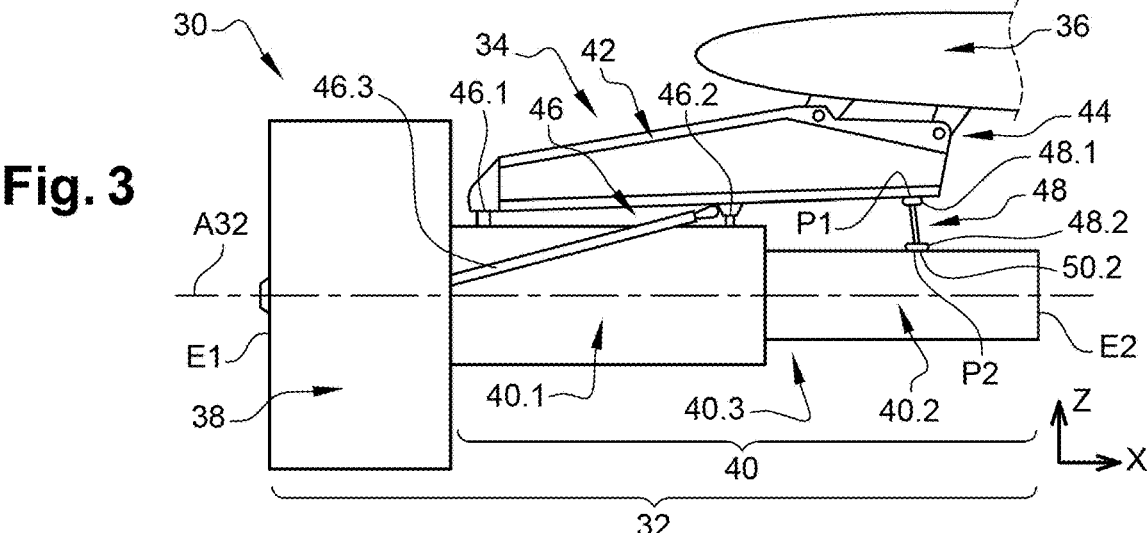
FIG. 1 is a perspective view of an aircraft.
FIG. 2 is a schematic longitudinal section of a propulsion unit illustrating an embodiment of the prior art.
FIG. 3 is a schematic longitudinal section of a propulsion unit illustrating an embodiment of the invention.

According to an embodiment which can be seen in FIG. 3, a propulsion unit 30 comprises an engine 32, a nacelle (not shown) positioned about the engine 32, in addition to a pylon 34 which is configured to connect the propulsion unit 30, and more particularly the engine 32, to a wing 36 of an aircraft. This aircraft comprises at least one such propulsion unit 30.

The engine 32 comprises a fan 38, in addition to a jet engine core 40 comprising a front part 40.1 integrating, in particular, the compression stages and combustion chambers, in addition to a rear part 40.2 integrating, in particular, the turbines and a nozzle.

According to one arrangement, the front and rear parts 40.1, 40.2 are connected in the region of a joining zone 40.3 located between the combustion chambers and the turbines.

According to one embodiment, the rear part 40.2 of the jet engine core 40 comprises an exhaust casing which has a plurality of structural frames which are offset relative to one another in the longitudinal direction. The pylon 34 comprises a primary structure 42 in the form of a box, which is connected to the wing 36 by a wing mount 44.

The propulsion unit 30 comprises at least one engine mount system 46 which connects the primary structure 42 of the pylon 34 and the engine 32. According to one arrangement, the engine mount system 46 connects, on the one hand, the primary structure 42 of the pylon 34 and, on the other hand, the front part 40.1 of the engine 32 and possibly the fan 38.

According to one embodiment, the engine mount system 46 comprises a front engine mount 46.1, a rear engine mount 46.2, in addition to a pair of thrust rods 46.3 which ensure the take-up of thrust forces. More specifically, the front and rear engine mounts 46.1, 46.2 connect the front part 40.1 of the jet engine core 40 and the primary structure 42 of the pylon 34. The rear engine mount 46.2 and the pair of thrust rods 46.3 are connected to the primary structure 42 of the pylon in the region of the central zone of the primary structure 42 which is located substantially equidistant from the front and rear ends of the primary structure 42. Naturally, the invention is not limited to this embodiment of the engine mount system 46. The front engine mount 46.1 could be connected to the fan 38. The engine mount system 46 can comprise between one and four engine mounts. Whatever the embodiment, the engine 32 comprises a front end E1 and a rear end E2. The engine mount system 46 is separated from the rear end E2 of the engine 32 and is configured to ensure the transmission of forces between the engine 32 and the pylon 34, in particular in the absence of a malfunction. The rear part 40.2 of the jet engine core 40 is offset toward the rear end E2 of the engine 32 relative to the engine mount system 46, more particularly relative to the rear engine mount 46.2 and extends as far as this rear end E2.

The engine 32, the pylon 34 and the engine mount system 46 are not detailed further since they could be identical to those of the prior art.

The propulsion unit 30 comprises a suspension system 48 which connects the pylon 34, more particularly the primary structure 42 thereof, and the rear part 40.2 of the jet engine core 40. In the case of a malfunction, if this rear part 40.2 becomes detached from the front part 40.1, it remains connected to the pylon 34 and does not fall off.

The suspension system 48 is separate from the rear engine mount 46.2 and located between the rear engine mount 46.2 and the rear end E2 of the engine 32. This suspension system 48 is configured so as not to ensure the transmission of forces between the engine 32 and the pylon 34 in the absence of a malfunction and to ensure the take-up of the weight of the rear part 40.2 of the jet engine core 40 in the case of a malfunction. To this end, the suspension system 48 comprises a first end 48.1 which is connected to a first anchoring point P1 which is fixed to the pylon 34, in addition to a second end 48.2 which is connected to a second anchoring point P2 which is fixed to the second part 40.2 of the jet engine core 40, the suspension system 48 having a length separating the first and second ends 48.1, 48.2 which is greater than a distance separating the first and second anchoring points P1, P2. The first anchoring point P1 is located in the vicinity of the rear end of the primary structure 42 of the pylon 34.

According to one configuration, the suspension system 48 is connected to one of the structural frames of the exhaust casing, in particular that positioned furthest to the front, to ensure an improved take-up of the forces generated in the case of a detachment of the rear part 40.2. Preferably, the suspension system 48 is offset toward the rear relative to the turbines, so as not to be damaged in the case of the rupture of one of the turbines.

According to one configuration, the suspension system 48 comprises at least one connecting element 50 which extends between the first and second ends 50.1, 50.2, in addition to at least one joint 52 which connects, directly or indirectly, the first or second end 50.1, 50.2 and an element from amongst the pylon 34 and the rear part 40.2 of the jet engine core 40, said joint 52 comprising at least one pivot axis A52 parallel to the longitudinal direction (parallel to the axis of rotation of the engine A32).

This configuration makes it possible for the rear part 40.2 of the jet engine core 40 to move relative to the primary structure 42.

Figure 4:
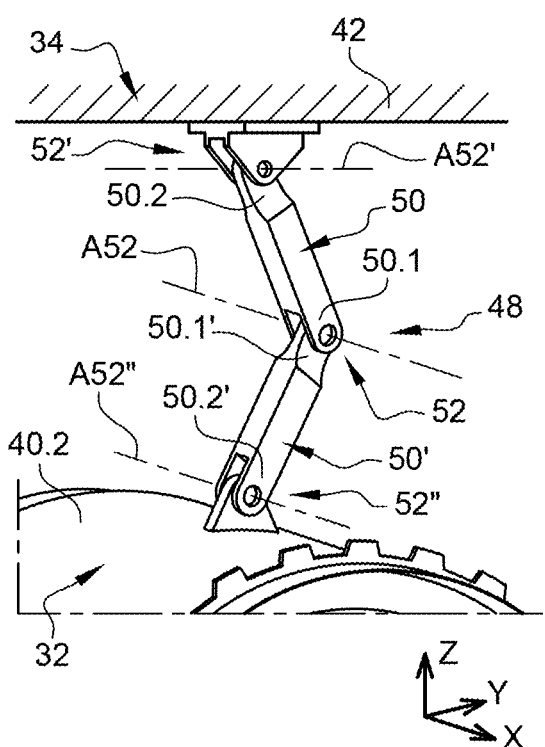
FIG. 4 is a perspective view of a suspension system of a rear part of a jet engine core illustrating an embodiment of the invention.
Figure 6:
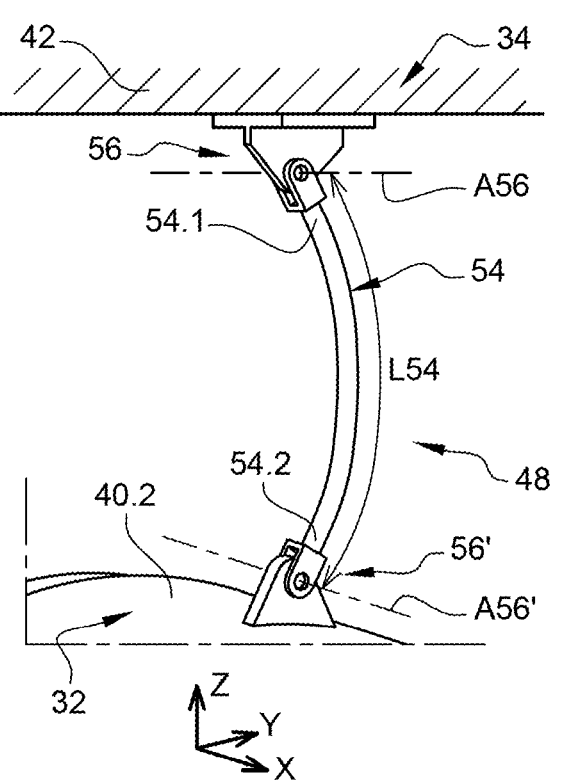
FIG. 6 is a perspective view of a suspension system of a rear part of a jet engine core illustrating a further embodiment of the invention.
Figure 5A:
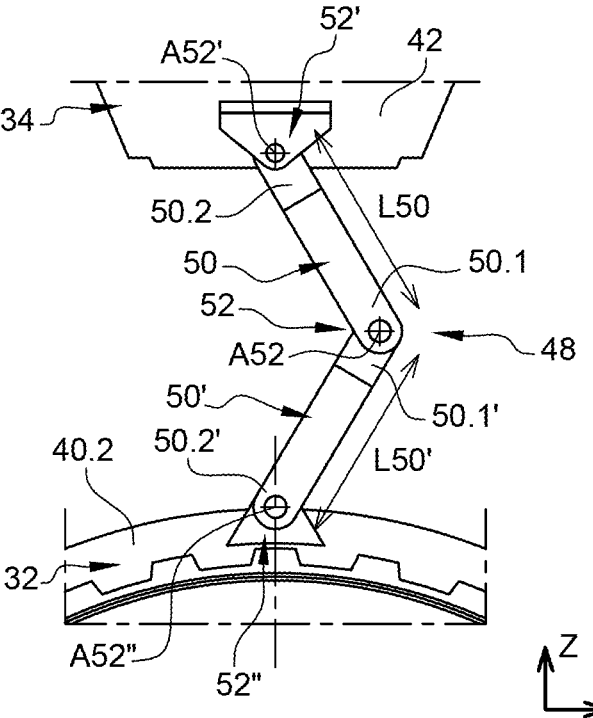
FIG. 5A is a front view of the suspension system which can be seen in FIG. 4, in the absence of a malfunction.
Figure 5B:
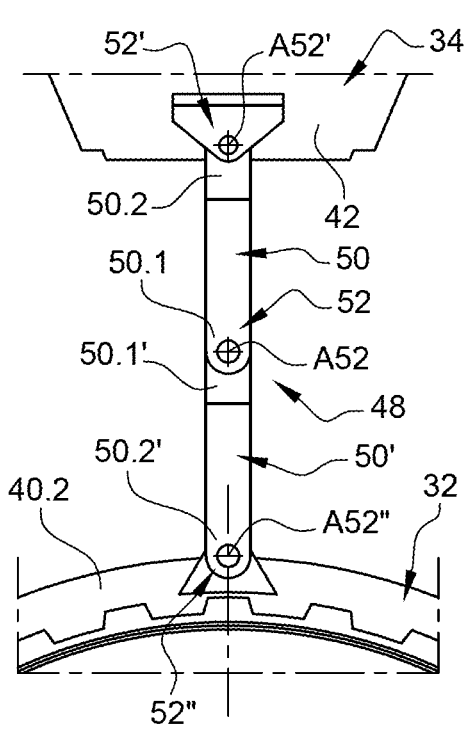
FIG. 5B is a front view of the suspension system which can be seen in FIG. 4, in the presence of a malfunction.

According to one embodiment, which can be seen in FIGS. 4 and 5, the suspension system 48 comprises first and second links 50, 50' in series, each having first and second ends 50.1, 50.2, 50.1', 50.2'; the first ends 50.1, 50.1' of the first and second links 50, 50' being connected to one another by a first joint 52, the second end 50.2 of the first link 50 being connected to the pylon 34, more particularly to the primary structure 42, by a second joint 52', the second end 50.2' of the second link 50' being connected to the rear part 40.2 of the jet engine core 40 by a third joint 52'' and the first, second and third joints 52, 52', 52'' each comprising at least one pivot axis A52, A52', A52'' parallel to the longitudinal direction (parallel to the axis of the engine A32).

This embodiment makes it possible to ensure a freedom of movement of the engine 32 relative to the pylon 34.

According to one arrangement, for each of the first and second links 50, 50 a first element from amongst the first and second ends 50.1, 50.2, 50.1', 50.2' comprises a clevis consisting of two branches traversed by coaxial through-orifices. In addition, a second element, which is different from the first element from amongst the first and second ends 50.1, 50.2, 50.1', 50.2', comprises a flat end, having a through-orifice, which is configured to cooperate with a clevis and to be positioned between the branches of the clevis.

According to one embodiment, the first joint 52 comprises a swivel cylinder, a flat end, having a through-orifice which is configured to house the swivel cylinder, fixed to a first part from amongst the first and second links 50, 50', in addition to a clevis which is configured to house the flat end, having through-orifices which are configured to house the swivel cylinder, fixed to a second part which is different from the first part from amongst the first and second links 50, 50'.

The second end 52' comprises a swivel cylinder, a flat end or a bracket, having a through-orifice which is configured to house the swivel cylinder, fixed to a first part from amongst the first link 50 and the pylon 34 (more particularly its primary structure 42), in addition to a clevis which is configured to house the flat end, having through-orifices which are configured to house the swivel cylinder, fixed to a second part which is different from the first part from amongst the first link 50 and the pylon 34 (more particularly its primary structure 42).

The third end 52'' comprises a swivel cylinder, a flat end or a bracket, having a through-orifice which is configured to house the swivel cylinder, fixed to a first part from amongst the second link 50' and the rear part 40.2 of the jet engine core 40, in addition to a clevis which is configured to house the flat end, having through-orifices which are configured to house the swivel cylinder, fixed to a second part which is different from the first part from amongst the second link 50' and the rear part 40.2 of the jet engine core 40.

According to one arrangement, the first and second links 50, 50' are dimensioned so as not to be aligned and to form an angle of less than 180° in normal conditions and in the absence of a malfunction, as illustrated in FIG. 5A. According to this arrangement, the first and second links have first and second lengths L50, L50' (the distance separating the pivot axis A52 of the first joint 52 and the pivot axis A52', A52'' of the second or third joint 52', 52''). The sum of the first and second lengths L50, L50' is greater than the direct distance (in a straight line) separating the pivot axes A52', A52'' of the second and third joints 52', 52''. The first and second links 50, 50' can be metallic, made of composite material or a hybrid thereof (metallic and made of composite material).

According to a second embodiment, the suspension system 48 comprises a flexible and deformable element 54 which extends between the first and second ends 54.1, 54.2 and has a length, in addition to an elongation which is less than 20% of the length. A first joint 56 connects the first end 54.1 and the pylon 34 and has a pivot axis A56 parallel to the longitudinal direction. A second joint 56' connects the second end 54.2 and the rear part 40.2 of the jet engine core 40 and has a pivot axis A56' parallel to the longitudinal direction. The flexible element 54 is a cable which is metallic, made of composite material or a hybrid thereof. The flexible element has a length L54, a distance separating the pivot axes A56, A56' of the first and second joints 56, 56' being greater than the direct distance (in a straight line) separating the pivot axes A56, A56' of the first and second joints 56, 56'.

According to one configuration, each of the first and second ends of the flexible element 54 comprises a clevis. In addition, the rear part 40.2 of the jet engine core 40 and the primary structure 42 of the pylon 34 each comprise a bracket which is configured to cooperate with the clevis of the first or second end 54.1, 54.2 of the flexible element 54.

Naturally, the invention is not limited to these embodiments for the suspension system 48.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A propulsion unit comprising:
   an engine which has an engine axis of rotation, the engine extending between a front end and a rear end and comprising a fan, a jet engine core which comprises a front part and a rear part;
   a nacelle positioned about the engine;
   a pylon;
   an engine mount system which connects the engine and the pylon, the engine mount system comprising a front engine mount, a rear engine mount, and a pair of thrust rods which take-up of thrust forces, the rear part of the jet engine core being offset toward the rear end of the engine relative to the rear engine mount and extending as far as the rear end; and, a suspension system connecting the pylon and the rear part of the jet engine core and which is located between the rear engine mount and the rear end of the engine, wherein the suspension system comprises a first end connected to a first anchoring point fixed to the pylon, and a second end which is connected to a second anchoring point fixed to the rear part of the jet engine core, the suspension system having a length, separating the first end and the second end which is greater than a length of the rear engine mount, wherein the second anchoring point is disposed closer to the rear end of the engine than the first anchoring point along the axis of rotation of the engine.

2. The propulsion unit as claimed in claim 1, wherein the length of the suspension system is greater than a distance separating the first anchoring point and the second anchoring point.

3. The propulsion unit as claimed in claim 1, wherein the rear part of the jet engine core comprises an exhaust casing which has a plurality of structural frames which are offset relative to one another in a direction parallel to the axis of rotation of the engine and wherein the suspension system is connected to one of the structural frames of the exhaust casing.

4. The propulsion unit as claimed in claim 1, wherein the suspension system comprises at least one connecting element which extends between the first end and the second end, and at least one joint which connects the first or second end and an element from amongst the pylon and the rear part of the jet engine core, said at least one joint comprising at least one pivot axis parallel to the axis of rotation of the engine.

5. The propulsion unit as claimed in claim 4, wherein the suspension system comprises first and second links in series, each having first and second ends; the first ends of the first and second links being connected to one another by a first joint, the second end of the first link being connected to the pylon by a second joint, the second end of the second link being connected to the rear part of the jet engine core by a third joint, and the first, second and third joints each comprising at least one pivot axis parallel to the axis of rotation of the engine.

6. The propulsion unit as claimed in claim 5, wherein the first joint comprises:
a swivel cylinder,
a flat end, having a through-orifice which is configured to house the swivel cylinder, fixed to a first part from amongst the first and second links, and a clevis which is configured to house the flat end, having through-orifices which are configured to house the swivel cylinder, fixed to a second part which is different from the first part from amongst the first and second links.

7. The propulsion unit as claimed in claim 5, wherein the second joint comprises:
a swivel cylinder,
a flat end or a bracket, having a through-orifice which is configured to house the swivel cylinder, fixed to a first part from amongst the first link and the pylon, and
a clevis which is configured to house the flat end, having through-orifices which are configured to house the swivel cylinder, fixed to a second part which is different from the first part from amongst the first link and the pylon.

8. The propulsion unit as claimed in claim 5, wherein the third joint comprises:
a swivel cylinder,
a flat end or a bracket, having a through-orifice which is configured to house the swivel cylinder, fixed to a first part from amongst the second link and the rear part of the jet engine core, and,
a clevis which is configured to house the flat end, having through-orifices which are configured to house the swivel cylinder, fixed to a second part which is different from the first part from amongst the second link and the rear part of the jet engine core.

9. The propulsion unit as claimed in claim 4, wherein the suspension system comprises:
a flexible and deformable element which has a length, an elongation which is less than 20% of the length and which extends between the first and second ends,
a first joint which connects the first end and the pylon and which has a pivot axis parallel to a longitudinal direction,
a second joint which connects the second end and the rear part of the jet engine core and which has a pivot axis parallel to the longitudinal direction.

10. The propulsion unit as claimed in claim 9, wherein the flexible and deformable element is a cable.

11. An aircraft comprising:
the propulsion unit as claimed in claim 1.

12. The propulsion unit as claimed in claim 1, wherein the first anchoring point is located in the vicinity of a rear end of a primary structure of the pylon.

13. The propulsion unit as claimed in claim 1, wherein the suspension system forms a non-perpendicular angle with the axis of rotation of the engine.

* * * * *